(12) United States Patent
Hohmann et al.

(10) Patent No.: US 8,210,495 B2
(45) Date of Patent: Jul. 3, 2012

(54) SOLENOID VALVE

(75) Inventors: Marc Hohmann, Marktheidenfeld (DE); Thorsten Fischer, Obermoos (DE)

(73) Assignee: Hilite Germany GmbH, Marktheidenfeld (DE)

( * ) Notice: Subject to any disclaimer, the term of this patent is extended or adjusted under 35 U.S.C. 154(b) by 392 days.

(21) Appl. No.: 12/590,330

(22) Filed: Nov. 4, 2009

(65) Prior Publication Data

US 2010/0117016 A1 May 13, 2010

(30) Foreign Application Priority Data

Nov. 5, 2008 (DE) .......................... 10 2008 055 972

(51) Int. Cl.
*F16K 31/12* (2006.01)
(52) U.S. Cl. ................................... 251/129.15; 251/366
(58) Field of Classification Search ............. 251/129.15, 251/356, 366
See application file for complete search history.

(56) References Cited

U.S. PATENT DOCUMENTS

| | | | | |
|---|---|---|---|---|
| 5,002,253 A | * | 3/1991 | Kolchinsky et al. | 251/129.15 |
| 5,261,610 A | * | 11/1993 | Waryu et al. | 239/585.4 |
| 5,377,720 A | * | 1/1995 | Stobbs et al. | 137/625.65 |
| 5,903,070 A | * | 5/1999 | Gobel | 310/17 |
| 5,918,635 A | * | 7/1999 | Wang et al. | 137/625.65 |
| 6,007,049 A | * | 12/1999 | Wass et al. | 251/368 |
| 6,086,042 A | | 7/2000 | Scott et al. | |
| 7,040,597 B2 | | 5/2006 | Mailaender | |
| 2004/0164829 A1 | | 8/2004 | Mailaender | |

FOREIGN PATENT DOCUMENTS

| | | |
|---|---|---|
| DE | 35 19 865 | 12/1985 |
| DE | 103 07 860 | 9/2004 |
| DE | 699 17 246 | 5/2005 |

* cited by examiner

*Primary Examiner* — John Fristoe, Jr.
(74) *Attorney, Agent, or Firm* — Lipsitz & McAllister, LLC

(57) ABSTRACT

The invention relates to a solenoid valve that is to be mounted leaktight and in a simple manner. Provided according to the invention is a first housing part with a tool engagement portion for screwing of a second housing part into an inner thread of a receptacle. The two housing parts are joined immovably to each other. The first housing part has a tensile strength that is greater than a tensile strength of second housing part.

10 Claims, 4 Drawing Sheets

1

SOLENOID VALVE

This application claims the benefit of German patent application no. 10 2008 055 972.5 filed Nov. 5, 2008, which is incorporated herein and made a part hereof by reference.

BACKGROUND OF THE INVENTION

The invention relates to a solenoid valve.

Already known from DE 35 19 865 A1 is a solenoid valve that has a housing with a thread.

Further known from DE 103 07 860 A1 is a solenoid valve that has a housing with regions of different wall thickness.

The problem of the invention is to create a leaktight and simple-to-mount solenoid valve.

This problem is solved by the present invention.

SUMMARY OF THE INVENTION

According to an advantage of the invention, the housing of the solenoid valve has at least two housing parts. A first housing part has a tool engagement portion—in particular, a hex-head—which ensures that the solenoid valve can be tightened with a high tightening torque in a receptacle with matching counterthread. This receptacle can be provided, by way of example, in a gear housing or a control plate or else in a reinforced section of a common-rail system.

Furthermore, the solenoid valve has a second housing part with an outer thread, which has a greater tensile strength than the first housing part.

On account of this high tightening torque, the screw connection does not settle or hardly settles, so that the solenoid valve can be secured highly against coming unscrewed from the receptacle. Because the material can accommodate appreciably higher tensions, it is also possible to choose a relatively small thread size—for example, M19—for which the settling has appreciably less effect.

Chosen for the housing in the region of the coil, by contrast, is a material that is optimized in terms of magnetic capacities. Thus, the first housing part can be annealed to produce a high magnetic permeability. In order to lower the magnetic resistance in the second housing part, it is possible in a particularly advantageous manner to provide the tool engagement portion on the second housing part in the region of the coil. In doing so, the tool engagement portion can then also be constructed to produce a better engagement surface with a thicker housing wall.

In a particularly advantageous manner, a bushing can be provided, within which a plunger for opening and closing the solenoid valve is guided smoothly so as to move linearly. This bushing can be constructed with a small diameter in the region of the second housing, so that the threaded pairing for screwing the solenoid valve has a relatively small diameter. This makes possible the aforementioned high tension in the threaded pairing. By contrast, the magnetic flux runs through a region of the bushing with a larger diameter. This guarantees an appropriately high opening force and closing force in the solenoid valve.

Such a high closing force is of advantage, in particular, for pressure-regulating valves that regulate very high pressures. These are, by way of example, the pressure-regulating valves of a common-rail system.

Further advantages of the invention ensue from the patent claims, the description, and the drawing.

The invention is described below in greater detail on the basis of three embodiments.

DETAILED DESCRIPTION OF THE INVENTION

Figure 1:
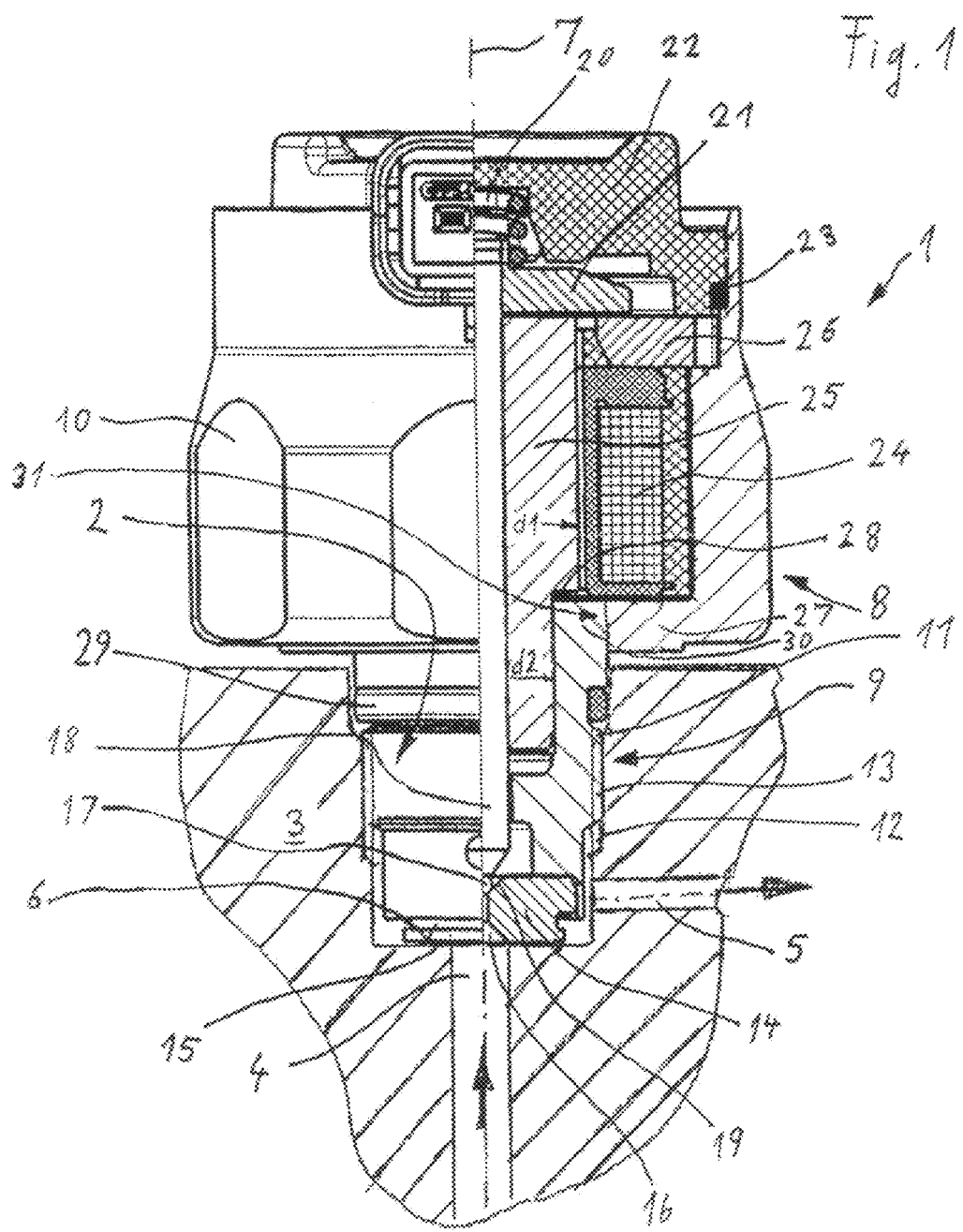
FIG. 1, a solenoid valve, which comprises one constructional unit composed of two housing parts,
FIG. 2, the constructional unit from FIG. 1. in a single part,
FIG. 3, a constructional unit in a second embodiment, and
FIG. 4, a constructional unit in a third embodiment.

FIG. 1 shows a solenoid valve 1, which is designed as a pressure-limiting valve. This solenoid valve 1 is screwed into a receptacle 2, which is designed as a threaded hole in a housing 3. In this case, this housing 3 can be, in particular, a gear housing or a control plate or else a reinforced region of a line system such as used, by way of example, in common-rail systems.

An inlet channel 4 and a tank return channel 5 leave the threaded hole. Inlet channel 4 runs from a hole bottom 6 of the threaded hole in alignment with the central axis 7 of solenoid valve 1. Tank return channel 5, by contrast, runs transversely to central axis 7 of solenoid valve 1. Solenoid valve 1 has a first housing part 8 and a second housing part 9. First housing part 8 has a tensile strength that is lower than a tensile strength of second housing part 9. First housing part 8 is made of a free-cutting steel, which, for reasons of magnetic permeability, is annealed and has a strength of 320 to 450 N/mm². By contrast, second housing part 9 is made of a tempering steel with a tensile strength of at least 550 N/mm².

First housing part 8 is arranged outside of receptacle 2 and has a hex-head 10 as the tool engagement portion on the outer casing surface. By contrast, second housing part 9 has an outer thread 11, which is screwed into an inner thread 12 of the threaded hole. In this case, by means of this threaded pairing 13, an end-face valve seat 14 is screwed tightly against the hole bottom 6. Accordingly, there is created in hole bottom 6 is a seal-surface pairing 15, which seals off inlet channel 4 against tank return 5. In order to design this seal-surface pairing 15 to be particularly leaktight, the aforementioned tool engagement portion 10 is provided so that solenoid valve 1 can be screwed with a very high, precisely limited torque of well over 30 Nm by using a torque wrench.

A valve seat 14 is provided on the side facing inlet channel 14, with a central inlet opening 16, which tapers in a funnel-shape toward the center of the valve seat. Provided on the other side of valve seat 14 is a funnel-shaped ball seat 19 for a closing ball 17 of solenoid valve 1. In the closed state of solenoid valve 1, this closing ball 17 is pressed by means of a plunger 18 with a high force against ball seat 19, so that no fluid can enter tank return 5 from inlet channel 4. In the opened state of solenoid valve 1, plunger 18 is pressed only with a low force against closing ball 17, so that a high internal pressure in inlet channel 4 is capable of lifting ball 17 from ball seat 19. In so doing, the internal pressure lifts plunger 18 against the force of a helical compression spring 20, on which plunger 18 rests via a flat retaining washer 21. Helical compression spring 20, on its part, rests on a valve cover 22, which is pressed immovably into first housing part 8. An O-ring seal 23 is provided, which seals first housing part 8 against housing cover 22.

First housing part 8 is essentially pot-shaped, with an electrical coil 24 being inserted inside of this first housing part 8. Inserted inside of this coil 24 is a bushing 25, within which the aforementioned plunger 18 is arranged in a linearly sliding manner. When a voltage is applied to coil 24, the magnetic flux thus runs via bushing 25,
flat retaining washer 21, a pole core 26 placed on coil 24, the tool engagement portion or first housing part 8, and a pot bottom 27 of first housing part 8 back into bushing 25. The wall thickness of housing part 8 is greater in the region of the tool engagement portion than outside of the magnetic flux. The magnetic flux flows into bushing 25 behind a shoulder 28 of bushing 25, so that this shoulder 28 lies outside of the magnetic flux. This shoulder 28 thereby separates a bushing region of larger diameter d1, which lies within the magnetic flux, from a bushing region of small diameter d2, which lies outside the magnetic flux. Because this region with small diameter d2 lies partially inside of second housing part 9, it is possible to keep the size of the outer thread 11 relatively small, less than 19 mm—that is, M19. Accordingly, the compression in this threaded pairing 13 is very high. Therefore, solenoid valve 1 is thus secured very highly against coming unscrewed.

An O-ring seal 29 is inserted into an annular groove 32, which is arranged adjacent to outer thread 11 and thus prevents the leakage of fluid from receptacle 2. What is involved in this case is fluid that reaches O-ring seal 29 from tank return 5 through threaded pairing 13.

Figure 2:
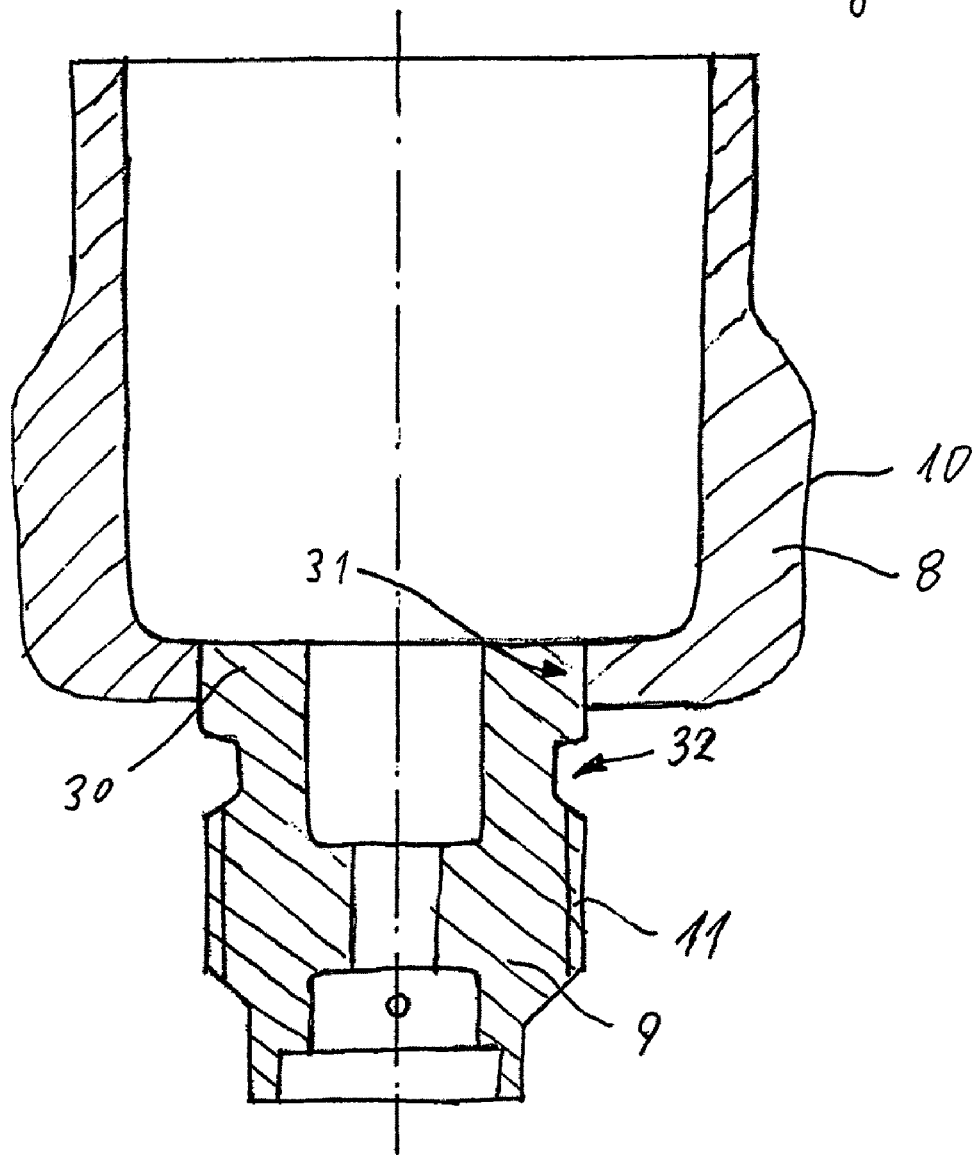

A pin-shaped end 30 of second housing part 9 extends from annular groove 32 out of receptacle 2. This pin-shaped end 30 inserts in a central hole 31 of first housing part 8 and is immovably welded to it. FIG. 2 shows, as a single part, the constructional unit composed of first housing part 8 and second housing part 9.

Figure 3:
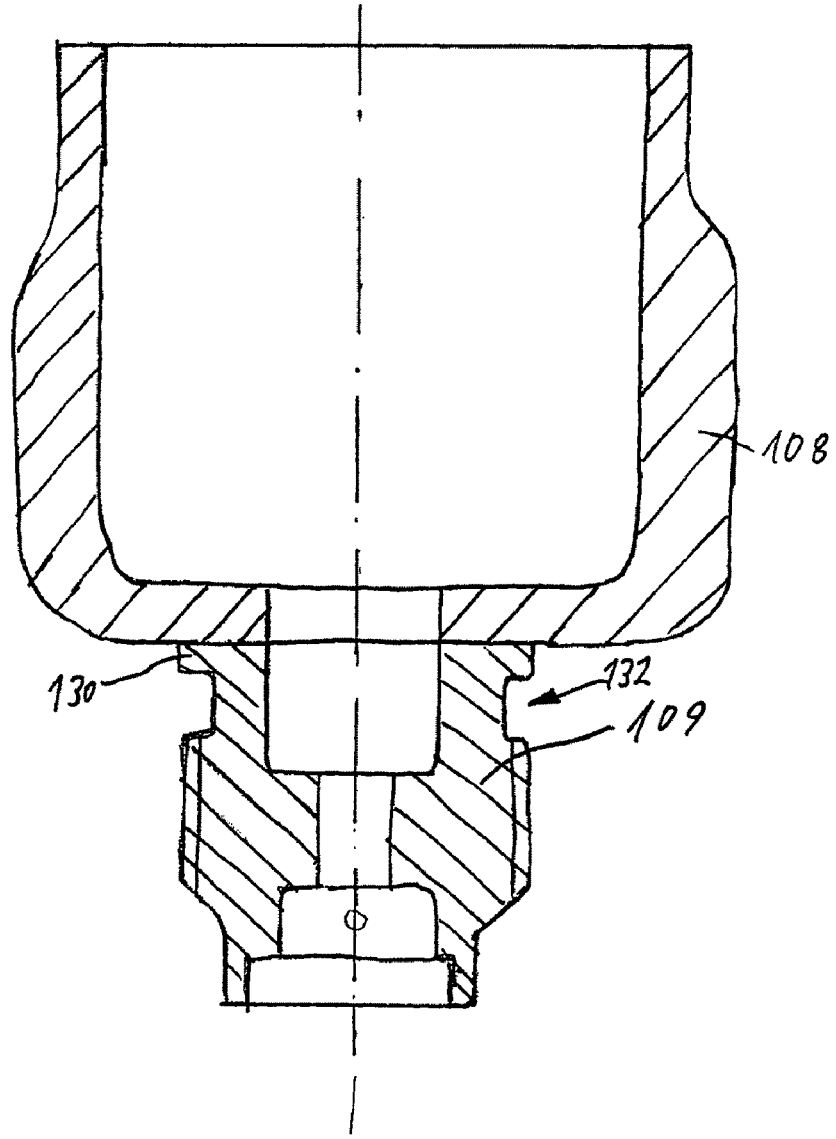

FIG. 3 shows, in an alternative embodiment, a constructional unit composed of first housing part 108 and second housing part 109. In contrast to the embodiment according to FIG. 1 and FIG. 2, pin-shaped end 130 of second housing part 109 is not inserted into a hole of first housing part 108. Instead of this, pin-shaped end 130 rests flush on first housing part 108 and is welded to it. Mutually aligned recesses of the two housing parts serve as centering during joining or welding. In order to produce the alignment in this case, the joining tool has a centering pin, which is not illustrated in the drawing in greater detail.

Figure 4:
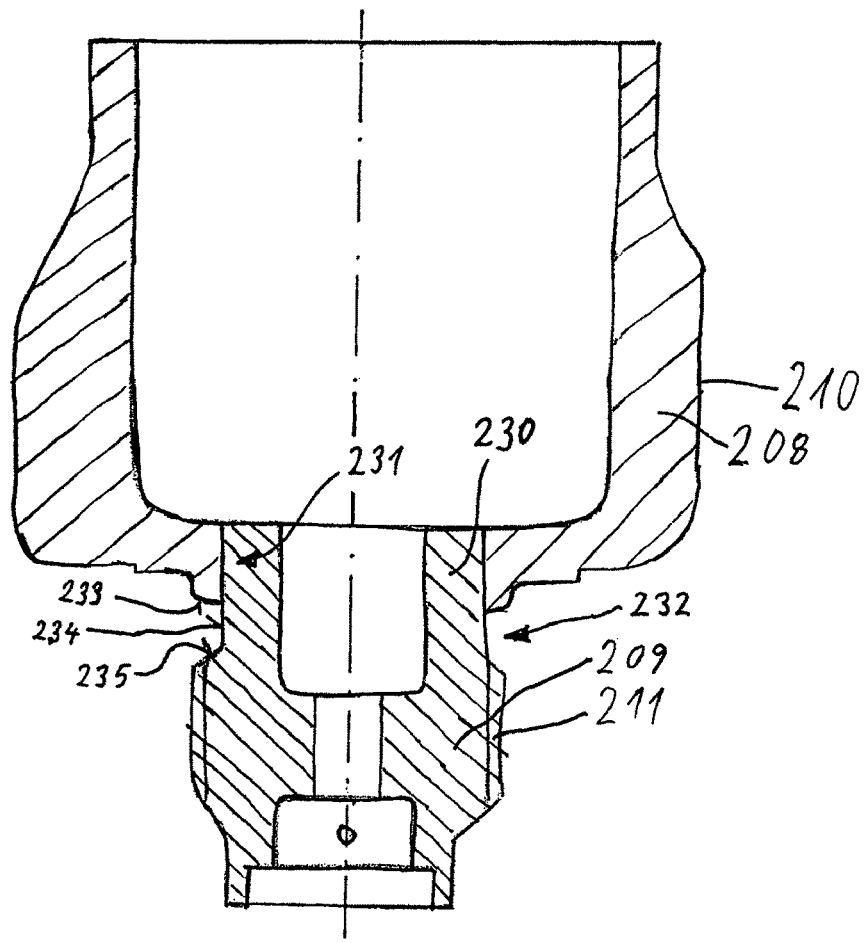

FIG. 4 shows, in another alternative embodiment, a constructional unit consisting of first housing part 208 and second housing part 209. In contrast to the two preceding embodiments according to FIG. 1 to FIG. 3, annular groove 232 is not formed in accordance with the two preceding annular grooves 32 and 132 solely by second housing part 209. Instead of this, second housing part 209 forms only the groove base 234 and one of the groove side walls 235. The other groove side wall 233 is formed by first housing part 208. Otherwise, the pin-shaped end 230 of second housing part 209 is inserted into a hole 231 of first housing part 208 analogously to the first embodiment.

In place of a hex-head, other tool engagement portions are also possible for all embodiments. By way of example, a square-head can be provided.

The two housing parts do not need to be welded to each other. A press fit can also be provided as the connection.

The solenoid valve does not need to be designed as a pressure-limiting valve. By way of example, it can also be designed as a distributing valve.

The described embodiments are only exemplary embodiments. A combination of the described features for different embodiments is also possible. Additional features of the device parts belonging to the invention, in particular those features not described, may be taken from the geometries of the device parts illustrated in the drawings.

What is claimed is:

1. A solenoid valve, comprising:

a first and a second housing part, a coil, an armature, a plunger mounted in a linearly movable manner for opening and closing the solenoid valve, the plunger being acted on by the armature, the first housing part having a tool engagement portion for screwing of the second housing part into an inner thread of a receptacle, the first and second housing parts being joined to each other immovably, and the second housing part having a tensile strength that is greater than a tensile strength of the first housing part.

2. A solenoid valve according to claim 1, wherein the tool engagement portion lies in a magnetic flux, a wall thickness of the first housing part in a region of the tool engagement portion being greater than the wall thickness outside of the magnetic flux.

3. A solenoid valve according to claim 1, wherein the plunger is mounted inside of a bushing, which bushing is constructed with a shoulder in such a way that a diameter of the bushing inside of the coil is greater than a diameter of the bushing inside of the second housing part.

4. A solenoid valve according to claim 3, wherein the shoulder lies outside of the magnetic flux of the solenoid valve.

5. A solenoid valve, comprising:

a first and a second housing part, the first housing part with a tool engagement portion for screwing of the second housing part into an inner thread of a receptacle, the first and second housing parts being joined to each other immovably, and the second housing part having a tensile strength that is greater than a tensile strength of the first housing part, wherein the tool engagement portion lies in a magnetic flux, a wall thickness of the first housing part in a region of the tool engagement portion being greater than the wall thickness outside of the magnetic flux.

6. A solenoid valve according to claim 5, wherein a plunger is provided for opening and closing the solenoid valve, said plunger being mounted in a linearly movable manner inside of a bushing, which bushing is constructed with a shoulder in such a way that a diameter of the bushing inside of a coil is greater than a diameter of the bushing inside of the second housing part.

7. A solenoid valve according to claim 6, wherein the shoulder lies outside of the magnetic flux of the solenoid valve.

8. A solenoid valve, comprising:

a first and a second housing part, the first housing part with a tool engagement portion for screwing of the second housing part into an inner thread of a receptacle, the first and second housing parts being joined to each other immovably, and the second housing part having a tensile strength that is greater than a tensile strength of the first housing part, wherein a plunger is provided for opening and closing the solenoid valve, said plunger being mounted in a linearly movable manner inside of a bushing, which bushing is constructed with a shoulder in such a way that a diameter of the bushing inside of a coil is greater than a diameter of the bushing inside of the second housing part.

9. A solenoid valve according to claim 8, wherein the shoulder lies outside of the magnetic flux of the solenoid valve.

10. A solenoid valve according to claim 8, wherein the tool engagement portion lies in a magnetic flux, a wall thickness of the first housing part in a region of the tool engagement portion being greater than the wall thickness outside of the magnetic flux.

* * * * *